UNITED STATES PATENT OFFICE.

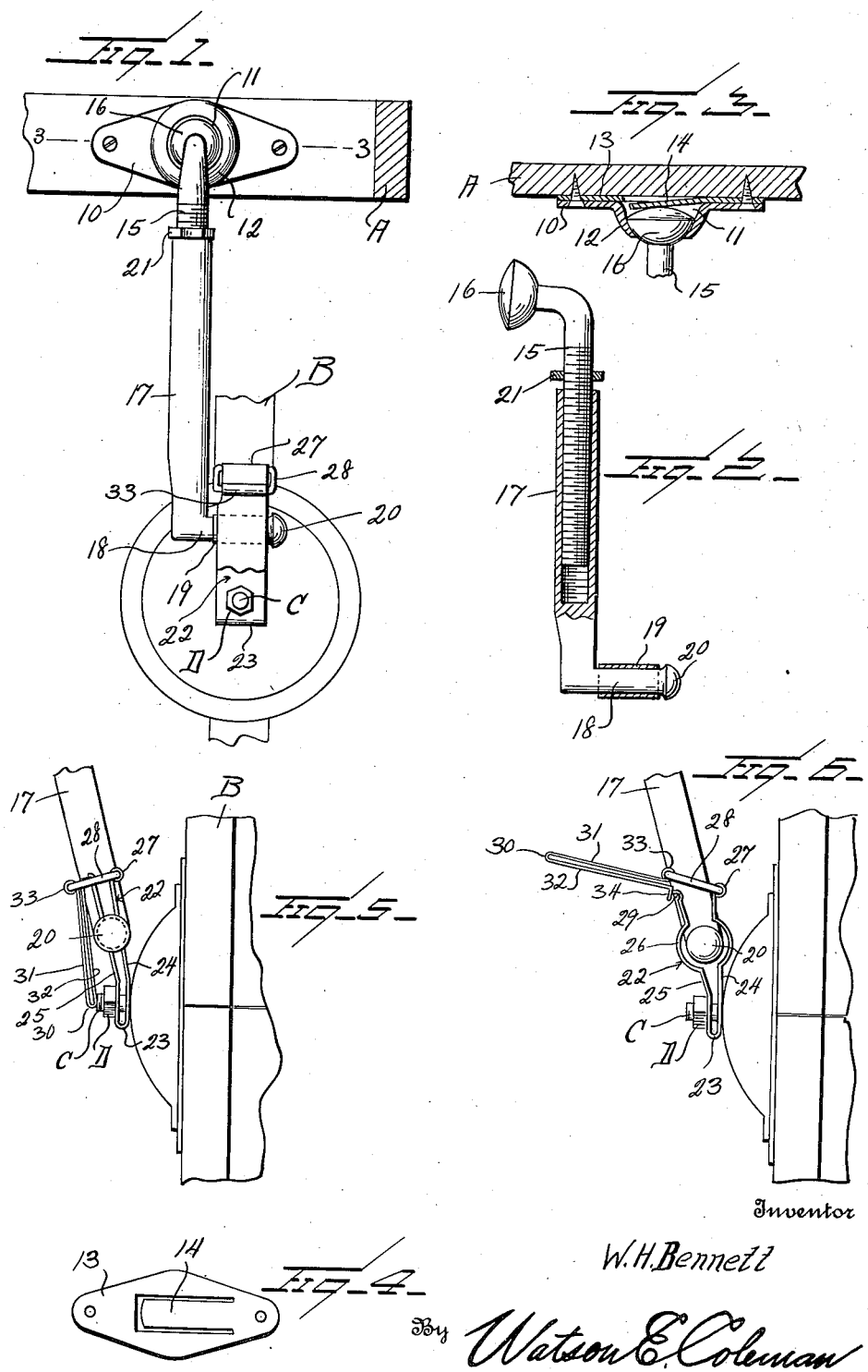

WILLIAM HERBERT BENNETT, OF CALVIN, OKLAHOMA.

AUTOMOBILE-TOP FASTENER.

1,407,118.  Specification of Letters Patent.  Patented Feb. 21, 1922.

Application filed October 5, 1921. Serial No. 505,659.

*To all whom it may concern:*

Be it known that I, WILLIAM HERBERT BENNETT, a citizen of the United States, residing at Calvin, in the county of Hughes and State of Oklahoma, have invented certain new and useful Improvements in Automobile-Top Fasteners, of which the following is a specification, reference being had to the accompanying drawings.

This invention relates to means for fastening the front end of an automobile top and has for its object the provision of a novel device adapted for use on Ford cars for the purpose of fastening the forward top bow to the windshield frame, my device being designed to replace the ordinary straps and hooks which form part of the regular equipment of automobiles of this make.

An important object is the provision of a connecting device which is so constructed as to permit the necessary side play of the top with respect to the windshield caused by travel of the vehicle over rough roads while at the same time to prevent upward movement of the top.

It is well known that the Ford automobile as originally equipped is provided with a pair of straps which are connected with the forward top bow and which carry hooks engageable with brackets carried by the ends of the bolts which pivotally connect the upper and lower sections of the windshield. When the vehicle is driven over a rough road it frequently occurs that these hooks become disengaged from the brackets and this results in allowing the top to become loose, this condition frequently resulting in serious injury to the top. It is with these facts in view that the present invention has been designed.

Another object is the provision of a connecting means of this character which is adjustable so as to be used conveniently in spite of the variation in the individual tops, the construction being such that after the adjustment is once made it will be maintained and will require no further attention.

Still another object is the provision of a securing means of this character which while permitting the necessary play is so constructed as to prevent any rattling whatever.

A still further object is the provision of a connector of this character which may be readily released when it is desired to put the top down.

An additional object is the provision of a device of this character which will be simple and inexpensive in manufacture, easy to install, positive in action, efficient in use, durable in service and a general improvement in the art.

With the above and other objects and advantages in view, the invention consists in the details of construction to be hereinafter more fully described and claimed, and illustrated in the accompanying drawings, in which:

Figure 1 is an elevation of my device in applied position the top bow being in section;

Figure 2 is an elevation of the connecting arm associated with the bow but disengaged from the clamp, the lower element being in section;

Figure 3 is a cross sectional view on the line 3—3 of Figure 2;

Figure 4 is a detail view of the base of the securing socket;

Figure 5 is an elevation taken at right angles to Figure 1; and

Figure 6 is a detail view showing the clamping member carried by the windshield frame in open position.

Referring more particularly to the drawings, the letter A designates the forward bow of the top of a Ford automobile and B designates one side of the windshield frame from the pivot joint of which extends a bolt C carrying a nut D.

In carrying out my invention I provide a socket member which is secured upon the bow A and this socket member is formed as an elongated plate 10 formed centrally with a hole 11 surrounded by a curved socket flange 12. Located beneath the plate 10 is a spring plate 13 which is formed with a stamped out tongue 14 which is extended at an angle and which projects into the space within the socket flange 12.

Associated with this socket device is an arm including an L-shaped upper member 15 terminating in a semi-spherical head 16 which is engaged within the socket flange 12, the shank of the arm passing through the hole 11. The spring tongue 14 above referred to engages against the end of the head 16 and holds it snugly in engagement with the socket flange to prevent play and rattling. This arm section 15 is externally threaded, as shown, and has threaded engagement within a lower L-shaped section 17 which terminates in a horizontally extending portion 18 carrying a sleeve or bushing 19 held in position by the upsetting of the end of the horizontal portion 18, indicated at 20.

Owing to the threaded engagement of the sections 15 and 17 it is apparent that longitudinal adjustment of the arm member may be made and such adjustment is maintained and looseness prevented by a jam nut 21 screwed upon the section 15 and engaging the upper end of the section 17.

In the further carrying out of the invention I remove the usual bracket which is secured upon the windshield bolt C, and also remove the nut D. I replace the usual bracket with the clamping device shown most clearly in Figure 6. This clamping device, designated broadly by the numeral 22, includes a main portion formed from a single strip of resilient metal bent upon itself, as indicated at 23, to define an attaching portion which is formed with holes for the passage of the bolt C, it being understood that the nut D is replaced in position upon the bolt. The strip of metal forming the major portion of this clamping device includes divergent arms 24 and 25 which are bent outwardly intermediate their ends to define mating substantially semi-cylindrical portions 26 designed to receive the sleeve or bushing 19 carried by the arm member. The terminal of the arm 24 is coiled upon itself, as shown at 27, to define a bearing for a rectangular link 28, while the extremity of the arm 25 is formed with a retaining lip 29.

The clamping structure further includes a lever 30 which is here shown as formed from a single strip of sheet metal bent upon itself intermediate its ends to define arms 31 and 32, the former of which has its free end coiled about the link 28, as shown at 33, and the latter of which terminates in a lateral extension 34 adapted to cooperate with the lip 29.

In installing my device, the arm section 15 is inserted through the hole 11 of the socket member 10 with the head 16 engaging within the socket flange 12. The spring plate 13 is then disposed against the under side of the socket member 10 and these two assembled members are secured upon the top bow A as by means of suitable screws or the like. When these parts are thus secured, the tongue 14 engages the head 16 and prevents rattling. The arm section 15 is then screwed on to the shank of the section 15 and when it has been adjusted to the desired point, which is determined by experimentation, the jam nut 21 is tightened to prevent relative movement of the parts. The clamping device is associated with the windshield bolt C, as shown and as above indicated, after which the lateral arm 18 carrying the bushing or sleeve 19 is engaged between the mating semi-cylindrical portions 26 of the clamp, after which the operator grasps the lever 30 and so disposes it that the extension 34 will engage the lip 29, whereupon the lever 30 is swung downwardly and this will result in forcing the arm 25 toward the arm 24 and this will clamp the sleeve carrying lateral extension 18. When the lever 30 is in its downwardly swung position it is apparent that it will be beyond center so that there will be no tendency of the parts to become disengaged accidentally.

When my device has been installed as above described and as shown, it will be apparent that the necessary lateral play of the top with respect to the windshield may occur owing to the fact that the head 16 has a pivotal engagement within the socket member 10 and that the arm formed by the assembled sections 15 and 17 has pivotal movement with respect to the clamp 22. It is, however, to be noted that there cannot be any up and down movement of the top and it is obvious that the parts cannot become displaced. In this way it will be seen that I have provided a very efficient means for connecting the top with the windshield frame, this means being moreover easily releasable merely by pulling upwardly on the lever 30 in case it is desired to put down the top.

While I have shown and described the preferred embodiment of the invention it is of course to be readily understood that I reserve the right to make such changes in the form, construction and arrangement of parts as will not depart from the spirit of the invention or the scope of the sub-joined claims.

Having thus described my invention, I claim:

1. Means for securing the forward bow of a vehicle top to the windshield frame, comprising a resilient clamping member carried by each side of the windshield frame and movably mounted with respect thereto, the clamping member including diverging arms formed with mating portions, one arm having a link pivoted upon its extremity and the other arm being formed with a lip, a lever pivoted upon the link and having an extension engageable with the lip for contracting the clamp, an arm having one end formed with a lateral extension engaged within the mating portions of the clamp arms, said last named arm having its other end formed with a laterally extending head, and a socket member carried by the bow and within which said head is held.

2. Means for securing the forward bow of a vehicle top to the windshield frame, comprising a separable clamping member movably mounted upon the windshield frame, an arm formed of threadedly connected L-shaped sections, one section being pivotally engaged within said clamping member and the other section terminating in a laterally extending head, and a socket member secured upon the bow and receiving said head.

3. Means for securing the forward bow of a vehicle top to the windshield frame, comprising a resilient clamping member carried by each side of the windshield frame and mounted upon the pivot bolt thereof, the clamping member including divergent arms formed with mating substantially semi-cylindrical portions, one arm pivotally carrying a link at its extremity and the other arm being formed with a lip, a lever pivoted upon the link and having an extension engageable with the lip for retracting the clamp, and an arm having one end pivotally connected with the top bow and having its other end formed with a lateral extension engaging within the mating semi-cylindrical portions of said clamp arms.

In testimony whereof I hereunto affix my signature.

WILIAM HERBERT BENNETT.